United States Patent [19]

Negroni

[11] 4,309,826
[45] Jan. 12, 1982

[54] APPARATUS FOR DETERMINING THE DIAMETER OF CORRECTIVE LENSES

[76] Inventor: Jean-Louis Négroni, 16 boulevard des Alliés, Choisy le Roi, France

[21] Appl. No.: 159,619

[22] Filed: Jun. 16, 1980

[30] Foreign Application Priority Data

Sep. 19, 1979 [FR] France ................................ 79 15702

[51] Int. Cl.³ .......................... A61B 3/10; G01B 9/08
[52] U.S. Cl. ................................. 33/200; 33/174 A; 351/5; 356/393
[58] Field of Search ................. 33/174 A, 200; 351/5; 356/393, 394, 397

[56] References Cited

U.S. PATENT DOCUMENTS

| | | | |
|---|---|---|---|
| 3,586,448 | 6/1971 | Beasse | 33/174 A |
| 3,804,528 | 4/1974 | Kilmer et al. | 356/165 |
| 4,098,002 | 7/1978 | Campbell et al. | 33/174 A |
| 4,099,881 | 7/1978 | Vanden Broek et al. | 356/171 |
| 4,196,978 | 4/1980 | Johnson | 33/200 |

FOREIGN PATENT DOCUMENTS 232293 3/1964 Austria ................................ 33/200
1491018 6/1967 France .

*Primary Examiner*—Richard R. Stearns
*Attorney, Agent, or Firm*—Weinstein & Sutton

[57] ABSTRACT

Apparatus for determining the diameter of corrective lenses adaptable to spectacle frames. The apparatus comprises at least a stand or structure provided with (a) a symmetrical linear measuring scale, (b) guiding means parallel to the said measuring scale, and (c) an underlying surface, a resting support and centering means all cooperating to hold a spectacle frame in a predetermined position. The apparatus further comprises at least one carriage sliding on the said guiding means and comprising a first part provided with a planar receiving surface adapted to receive removable plates provided with reference marks and lines representing at least the outline of one or more types of uncut corrective lenses, and a second part equipped with a semi-reflecting mirror placed in the bisecting plane of the dihedron angle defined by the said receiving surface and the said reference plane.

14 Claims, 3 Drawing Figures

APPARATUS FOR DETERMINING THE DIAMETER OF CORRECTIVE LENSES

The present invention relates to an apparatus for determining the diameter of corrective lenses adaptable to spectacle frames.

Industrially produced corrective lenses for spectacles generally have a circular outline and opticians are required to adapt each lens to the shape of the frame selected by the customer. A special problem arises due to the fact that when a customer has selected a certain type of frame, the optician has not the corrective lenses in stock and must first order them from the manufacturer in order to thereafter cut them to size and adapt them to the selected frame. For obvious reasons of economy, it is preferable to choose from the different sizes of corrective lenses of a given type, one whose diameter is the smallest possible but which allows the rim of the selected frame to be completely filled the shape of the frame being generally non-circular, but ensuring an optically accurate assembly. The choice and positioning of a corrective lens is thus dependent on the type of frame selected and need also take into account factors that are related to the user, such as for example the value of half the pupillary distance, which varies with every individual. It has proved especially difficult to determine the diameter of a corrective lens of a selected type, in the presence of a specific user and spectacle frame, when the different sizes of lenses which exist are not available to the optician to allow tests of various sizes that may be suitable.

Various methods and devices have already been proposed to determine the serviceable diameter of spectacle lenses to be adapted to a specific frame and in relation to the user. Thus according to a first system, already known, a measuring device which comprises movable elements and a guiding frame whose shape recalls that of a spectacle frame is fitted on the frame proper and used on the patient. Some elements of the measuring device are vertically and horizontally movable for superposing a reference mark on the pupil of the patient, and reference lines in arc of circles permit to determine the serviceable lens diameter. Such a system, however, shows disadvantages since it is relatively fragile and requires a number of rather long operations on the patient himself, this being rather awkward. Moreover, the fitting of the guiding frame of the measuring device on the spectacle frame proper, is not adapted for frames without bezels. Said known measuring device, which is adapted to graded lenses, cannot be for bifocal or trifocal lenses, and involves manipulations that are too lengthy when choosing unifocal lenses.

It is also known to use a set of truncated circular discs made of transparent plastics, provided with reference lines and designed to correspond to different diameters of uncut corrective lenses of standard type. The truncated circular discs are superposed in succession on the selected spectacle frame, whilst the latter is worn by the user. This system is also rather awkward as it implicates successive superpositions of discs on a spectacle frame whilst the latter is actually worn by the user, this being rather uncomfortable.

It is precisely the object of the present invention to overcome the aforesaid disadvantages and to afford the possibility of determining easily and instantly the lens diameter which is appropriate to a spectacle frame and to an individual whilst causing the minimum inconvenience to the individual.

It is a further object of the invention to propose a measuring device which can be used to determine the diameter of a large variety of different types of lenses, such as for example unifocal, bifocal and graded lenses.

These objects are attained with an apparatus of the type described hereinabove which, according to the invention, comprises at least a stand or structure provided with (a) a symmetrical linear measuring scale, (b) guiding means parallel to the said measuring scale, and (c) an underlying surface, a resting support and centering means for holding a spectacle frame in a predetermined position relative to a reference plane defined by said resting support and parallel to the said measuring scale and symmetrically with respect to a plane perpendicular to the said reference plane and crossing the middle axis of the said symmetrical measuring scale. The invention further comprising at least one carriage sliding on the said guiding means in front of the said measuring scale and the said reference plane, the said carriage comprising a first part provided with a planar receiving surface, parallel to the said measuring scale, forming a dihedron angle with the said reference plane, and adapted to receive removable plates provided with reference marks and lines representing at least the outline of one or more types of uncut corrective lenses, and a second part equipped with a semi-reflecting mirror placed in the bisecting plane of the dihedron angle defined by the said receiving surface and the said reference plane.

According to one particular embodiment, the semi-reflecting mirror is inclined so as to form an angle of approximately 45° with, on the one hand, the reference plane, and on the other hand, the receiving surface.

Preferably, the underlying surface provided to receive the spectacle frame is substantially parallel to the said receiving surface of the carriage.

The resting support of the spectacle frame comprises a framework which is fitted on the lower surface and defines the said reference plane.

Centering means are provided to hold the spectacle frame symmetrically with respect to a plane perpendicular to the reference plane and crossing the middle axis of the measuring scale, and comprises an adjustable support which is movable in parallel to the reference plane.

According to one characteristic of the present invention, the removable plates are made of transparent plastics.

A measuring scale is formed on the receiving surface of the removable plates.

In this case, it is advantageous if the measuring scale formed on the surface receiving the removable plates can be moved in its plane in a direction which is perpendicular to the direction in which the sliding carriage moves.

For better viewing, a source of light is placed in the sliding carriage, under the surface receiving the plates, which surface is also transparent.

A source of light is placed in the stand or structure and cooperates with a reflecting surface to light up the said reference plane.

Further means for controlling the intensity of the light sent into the said reference plane by the source of light situated in the stand can also be provided.

The apparatus according to the invention thus affords the possibility of carrying out accurate measurements comfortably, due to the fact that the spectacle frame is always on a stable support and that the combination of means used guarantees a total display of all the factors that need to be taken into account to determine the adequate diameter of a certain type of lens in relation to a particular spectacle frame.

The invention will be more readily understood on reading the following description with reference to the accompanying drawings in which.

Figure 1:
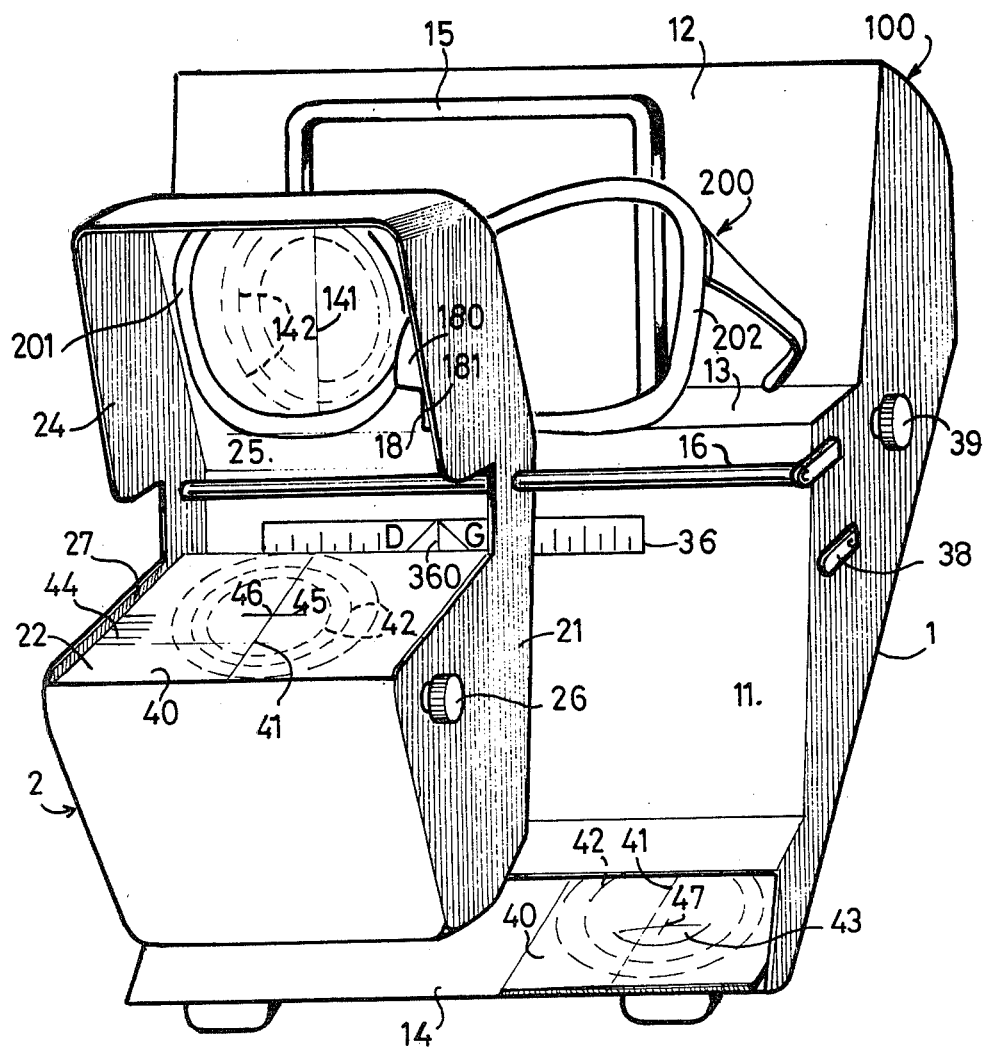
FIG. 1 is a perspective view of an apparatus according to the invention.

FIG. 1 shows an apparatus 100 comprising a stand or structure 1 with a front face 11, an underlying surface 13 for receiving a spectacle frame 200 and a rear casing 12 whose inner part forms a reflecting screen. A supporting framework 15 is mounted on the underlying surface 13, and permits it to hold the frame 200 in position, which frame rests on the lower surface 13. Thus, the frame 200 is in a plane substantially parallel to the plane of the framework 15.

A graduated measuring scale 36 is affixed on the front face of the structure 1 beneath the underlying plane 13. The measuring scale 36, which is parallel both to the underlying plane 13 and to the reference plane defined by the framework 15, is symmetrical with respect to an origin 360 which defines the axis of the apparatus. Centering means 18 are arranged above the underlying surface 13 and are meant to hold the middle part of the frame 200 on an axis which passes through the origin 360 and is perpendicular to the measuring scale 36. The centering means 18 can comprise, for example, a head 180 which comes into position between the two rims 201, 202 of the frame 200 under the joining bridge 203, in order to prevent any lateral play for the frame 200. The height of the centering means 18 is adjustable and the position of the head 180, mounted on the rod 181, can be controlled by the handle 38, in order to be adapted to the different shapes and sizes of frames and to secure the axial position of the frame 200 without preventing the two rims 201, 202 of the frame from resting on the underlying surface 13.

Figure 2:
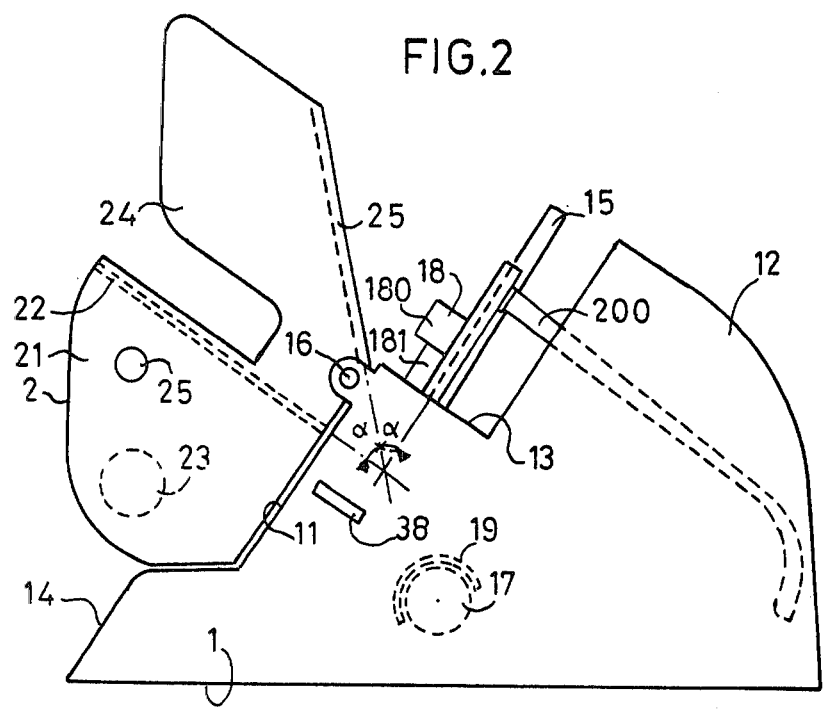
FIG. 2 is a side view of the apparatus shown in FIG. 1.

A light 17 (FIG. 2) is advantageously placed in the structure 1 in order to light up the inner reflecting surface of the casing 12, and as a result, to light up the reference surface constituted by the plane of the frame 200 which is parallel to the framework 15. An opaque cover 19 can be manoeuvered by means of a knob 39 to adjust the quantity of light sent to the reflecting screen of the casing 12. Of course, the intensity of the light generated by the lamp 17 can also be controlled directly by acting on the electrical supply, using a rheostat, for example.

A carriage 2 is mounted on the front part of the apparatus, in front of the front face 11, of the underlying surface 13 and of the frame 200. The carriage 2 can slide on a guide rail 16, in parallel to the front face 11 of the structure 1 and to the measuring scale 36. The carriage 2 comprises a lower body 21 which has a receiving surface 22, and an upper hood 24 provided with two side branches between which is inserted a semi-reflecting mirror 25. The carriage 2 is open on its front and rear faces at the level of the upper hood 24 so as to allow viewing through the reflecting mirror 25, as well as in a middle part, so that the measuring scale 36 becomes visible, in front of which measuring scale can slide the carriage 2.

The mirror 25 is situated in the bisector plane of the dihedron constituted, on the one hand by the reference plane of the framework 15 against which rests a frame 200, and on the other hand, by the receiving surface 22 situated on top of the lower body 21 of the carriage 2. According to one advantageous example, the angle $\alpha$ between the mirror 25 and the reference plane of the framework 15, or between the mirror 25 and the receiving surface 22 is about 45°.

The receiving surface 22 is preferably constituted by a transparent plate, such as in glass or plastic material, and is provided to receive a removable plate, such as 40, which is also preferably transparent and is made of plastic material for example. A plate such as 40 comprises a longitudinal axis 41 and various lines 42 representing the outlines of standard uncut lenses of different diameters. The image of the plate 40 is reflected by the semi-transparent mirror 25 and is superposed on the spectacle frame 200 in order to form, for any observer placed in front of the mirror 25, projected lines 141, 142, which are identical to the lines 41, 42. In the case where the receiving surface 22 of the lower body 21 of the carriage 2 and the plates 40 are both transparent, a lamp 23 placed inside the lower body 21 can light up a plate 40 and make viewing easy through the semi-transparent mirror 25 which, on the one hand, sends back to the observer the image of the plate 40 and on the other hand, brings the frame 200 into view. The equilibrium between the lighting up of the frame and of the plate 40 is easily produced with an operating knob 39 which acts on the light 17.

The receiving surface 22 of the carriage body 21 is also advantageously provided with lines 44 forming a measuring scale, which lines are superposed on the lines or reference marks provided on the plates 40. According to one special embodiment, the lines 44 superposed on the receiving surface 22 can be moved in the plane of the said surface by means of a control knob 26, for example, in a direction which is perpendicular to the moving direction of the sliding carriage. This facilitates the measuring.

As can be seen in FIG. 1, the lower part 14 of the apparatus 100 can be used as a storing drawer for unused plates 40.

The way in which the measuring apparatus according to the invention works and is used will now be explained in detail, with reference to FIGS. 1 and 3.

First it is assumed that, the value of half the pupillary distance on the user as well as, when it is a case of fitting multifocal or graded lenses, the distance between the pupil and the inner edge of the lower part of the rim of the selected frame, have been previously measured on the user in a conventional manner. There now remains to determine, on the basis of the aforesaid information, of the power and type of lens selected, the diameter of the uncut lenses adapted to be mounted in the rims of the selected frame. The apparatus according to the invention affords the possibility to do so with the selected frame, without any other testing or measuring operations being required on the user or on the frame worn by the user.

The selected frame is first set on the head 180 of the centering means 18 and rested against the framework 15 in parallel thereto. The frame is then lowered on the underlying surface 13 until the two rims 201 and 202 are resting steadily on the said surface 13. The frame is thus perfectly wall centered with respect to the axis passing through the origin 360 of the fixed measuring scale 36. A plate 40, provided with lines and reference marks corresponding to the type of lenses to be fitted on the spectacle frame is then placed on the receiving surface 22 of the carriage 2.

Each plate 40 is rectangular and planar and comprises, besides a longitudinal axis 41, a reference line 46, which corresponds to the optical centre, and various circles 42 which correspond to the diameters of standard lenses, such as for example 50, 60, 65, 70, 75 mm. Each plate 40 is also provided, inside the circles, with reference marks which vary with the type of the lens. Said additional reference marks 43, 45, 47 do not exist in the case of unifocal lenses, but they are necessary with multifocal or graded lenses and permit the accurate positioning of a circle which corresponds to a fictitious lens, with respect to the spectacle frame, while taking into account the previously determined positions of the user's pupil with respect to the said frame.

Figure 3:
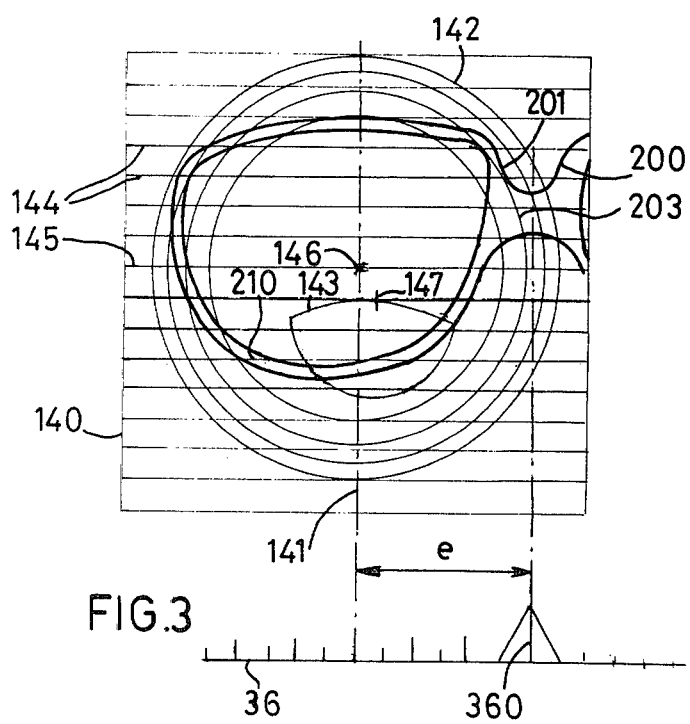
FIG. 3 is a detailed view showing the superposition of the images seen through the carriage 2 of the apparatus of FIG. 1.

By way of example, the diameter of a bifocal lens to be mounted on the right rim 201 of a spectacle frame 200 will be now determined with reference to FIG. 3. A plate 40 corresponding to the bifocal lens is placed on the receiving surface 22 of the carriage 2. The spectacle frame is placed, as indicated hereinabove, against the framework 15, and its central bridge 203 rests on the centering head 180 which is lowered until the lower parts of the rims of the frame rest firmly on the surface 13. The carriage 2 is then moved in front of the graduated scale 36 of the front face 11 of the apparatus. The measuring scale 36 is visible under the semi-transparent mirror 25 and, preferably, through the carriage 2, immediately above the receiving surface 22 of the lower body 21. The carriage can then be easily positioned so that, on the measuring scale 36, the distance between the origin 360 and the reference line 141 situated in front of the longitudinal axis 41 of the plate 40, corresponds to half the pupillar distance e of the user. The relative positions of the frame and of the plate 40 are thus well defined laterally and the real and virtual images of the rim 201 and of the plate 40 are superposed behind the screen constituted by the mirror 25. In the case of unifocal lenses, the only operation that remains to be done is to compare the rim 201 of the frame with the circles 142 representing the lenses in order to determine the circle with the smallest diameter which will cover the whole surface of the rim 201 of the frame. In the case of bifocal lenses, the vertical positioning of the lenses is not immaterial. For this reason, the image 144 of a reference graduation of the measuring scale 44 of the receiving surface 22, should first be brought level with the inner edge 210 of the lower part of the rim 201 of the frame 200, using the control knob 26. The position of the pupil with respect to the lower edge 210 can then be easily located due to the lines 144, and a sliding movement of the plate 40 on the receiving surface 22 affords the possibility of moving the image 140 of the plate 40 with respect to the reference lines 144 and to the frame 200 in order to position the reference lines 143, 145 accurately. It suffices then, as in the preceding case of unifocal lenses, to locate the circle 142 with the exact diameter to cover the whole inner surface of the rim 201.

The measuring operations made on the right rim 201 of a spectacle frame can be carried out in the same way on the left rim 202. It suffices to move the carriage 2 to the other side of the central reference 360 and to place on the receiving surface 22 a plate 40 which corresponds to the left lens, whenever the lens whose diameter has to be determined is not unifocal.

The apparatus according to the invention can be used to determine the diameter of a wide range of lenses, without having these lenses in stock, but instead cheap plates, made of plastic material for example, which are easy to produce, since they only need to carry a limited number of references which are characteristic of the type of lens to be selected.

The operations which consist in superposing the image 140 of a plate 40 on a frame 200 are particularly simple since, as long as the frame is placed on the apparatus, it suffices to move in two perpendicular directions, by simple sliding along guide rails 16 and 27, respectively, the carriage 2 with respect to the structure 1 of the apparatus, and the plate 40 with respect to the carriage 2. In the case of unifocal lenses in particular, it suffices, first to position the carriage 2 so that the longitudinal axis 41 of a plate 40 is at a suitable distance e from the origin 360, and then to cause the plate 40 to slide progressively between the guiding edges 27 of the lower body 21 of the carriage 2, which edges are parallel to the said axis 41 in order to define on the mirror 25 the smallest circle 142 capable of covering entirely the rim 201 of the frame.

It is preferable, for convenience's sake, that the semitransparent mirror 25 be situated substantially in a vertical plane, or in a plane which is only slightly inclined with respect to the vertical, and that the underlying surface 13 as well as the receiving surface 22 be inclined so that their front part is raised and a spectacles frame 200 and a plate 40 can easily abut respectively against the supporting framework 15 and against the base of the carriage 2 or the front face 11 of the structure 1.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for determining the diameter of corrective lenses adaptable to a spectacle frame, comprising (a) a symmetrical linear measuring scale, (b) guiding means parallel to the said measuring scale, and (c) an underlying surface, a resting support and centering means all cooperating to hold a spectacle frame in a predetermined position relative to a reference plane parallel to the said measuring scale and symmetrically with respect to a plane perpendicular to the said reference plane and crossing the middle axis of the said symmetrical measuring scale, and further comprising at least one carriage sliding on the said guiding means in front of the said measuring scale and the said reference plane, the said carriage comprising a first part provided with a planar receiving surface, parallel to the said measuring scale, forming a dihedron angle with the said reference plane, and adapted to receive removable plates provided with reference marks and lines representing at least the outline of one or more types of uncut corrective lenses, and a second part equipped with a semi-reflecting mirror placed in the bisecting plane of the dihedron angle defined by the said receiving surface and the said reference plane.

2. The apparatus of claim 1, wherein the semireflecting mirror is inclined so as to form an angle of approximately 45° with, on the one hand, the reference plane, and on the other hand, the receiving surface.

3. The apparatus of claim 1 or claim 2, wherein the underlying surface provided to receive the spectacle frame is substantially parallel to the said receiving surface of the carriage.

4. The apparatus of any one of claims 1 or 2, wherein the resting support of the spectacle frame comprises a framework which is fitted on the underlying surface and defines the said reference plane.

5. The apparatus of claim 1, wherein the centering means provided to hold the spectacle frame symmetrically with respect to a plane perpendicular to the reference plane and crossing the middle axis of the measuring scale, comprises an adjustable support which is movable in parallel to the reference plane.

6. The apparatus of claim 1, wherein the removable plates are made of transparent plastic.

7. The apparatus of claim 6, wherein a measuring scale is formed on the receiving surface of the removable plates.

8. The apparatus of claim 7, wherein the measuring scale formed on the surface receiving the removable plates can be moved in its plane in a direction which is perpendicular to the direction in which the sliding carriage moves.

9. The apparatus of any one of claims 6 to 8, wherein a source of light is placed in the sliding carriage, under the surface receiving the plates, which surface is also transparent.

10. The apparatus of claim 1, further including a source of light which cooperates with a reflecting surface to light up the said reference plane.

11. The apparatus of claim 10, further including means for controlling the intensity of the light sent into the said reference plane by said source of light.

12. The apparatus of claim 1, wherein a plurality of removable plates are provided, which plates can be placed in succession on the receiving surface of the carriage.

13. The apparatus of claim 12, wherein each removable plate comprises reference marks and lines relative to corrective lenses of different diameter, but of the same type.

14. Apparatus for determining the diameter of corrective lenses for a spectacle frame, comprising means for holding said spectacle frame in a predetermined orientation relative to a reference plane, a measuring scale parallel to said reference plane, guiding means parallel to said measuring scale, carriage means sliding on said guiding means in front of said measuring scale and said reference plane, said carriage means comprising a planar receiving surface forming an angle with said reference plane, said receiving surface adapted to receive removable plates provided with indicating marks representing at least the outline of one or more types of uncut corrective lenses, said carriage means further comprising a mirror placed at an angle between said receiving surface and said reference plane for displaying the indicating marks on said removable plates.

* * * * *

UNITED STATES PATENT AND TRADEMARK OFFICE
CERTIFICATE OF CORRECTION

PATENT NO. : 4,309,826
DATED : January 12, 1982
INVENTOR(S) : Jean-Louis Negroni It is certified that error appears in the above—identified patent and that said Letters Patent is hereby corrected as shown below:

Column 5, line 2: Change "wall" to --well--.

Signed and Sealed this

Seventeenth Day of August 1982

[SEAL]

Attest:

*Attesting Officer*

GERALD J. MOSSINGHOFF
*Commissioner of Patents and Trademarks*